(12) United States Patent
Joo et al.

(10) Patent No.: US 7,637,188 B2
(45) Date of Patent: Dec. 29, 2009

(54) WORKPIECE EJECTING DEVICE FOR A MACHINE TOOL

(75) Inventors: Tae Hwan Joo, Gimhae-si (KR); Kyeong Sik Kwon, Changwon-si (KR)

(73) Assignee: Doosan Infracore Co., Ltd., Incheon (KR)

( * ) Notice: Subject to any disclaimer, the term of this patent is extended or adjusted under 35 U.S.C. 154(b) by 433 days.

(21) Appl. No.: 11/228,383

(22) Filed: Sep. 19, 2005

(65) Prior Publication Data
US 2006/0060039 A1    Mar. 23, 2006

(30) Foreign Application Priority Data
Sep. 21, 2004   (KR) .................. 10-2004-0075440
Dec. 30, 2004   (KR) .................. 10-2004-0117472

(51) Int. Cl.
*B23B 3/26* (2006.01)
*B23B 13/00* (2006.01)

(52) U.S. Cl. .................. 82/124; 82/142; 279/156; 408/68

(58) Field of Classification Search .................. 82/124, 82/142, 165, 152, 110; 279/134, 146, 156; 408/68; *B23B 003/26*
See application file for complete search history.

(56) References Cited

U.S. PATENT DOCUMENTS 3,174,765 A * 3/1965 Atherholt, Sr. ............. 279/4.03
3,823,628 A * 7/1974 Fortune ...................... 82/126
3,899,264 A * 8/1975 Tobias ........................ 408/14
4,133,230 A * 1/1979 Inaba et al. ................. 82/142
4,749,314 A * 6/1988 LeBlond ..................... 408/68
4,913,599 A * 4/1990 Andolora .................... 408/48
5,077,876 A * 1/1992 McConkey .................. 29/27 R
7,134,369 B1 * 11/2006 Stevens et al. .............. 82/124
2008/0181978 A1 * 7/2008 Ho ............................. 425/139

FOREIGN PATENT DOCUMENTS

KR    100177625 B1    11/1998

* cited by examiner

*Primary Examiner*—Boyer D Ashley
*Assistant Examiner*—Sara Addisu
(74) *Attorney, Agent, or Firm*—Duane Morris LLP (57) ABSTRACT

A workpiece ejecting device for a machine tool, in which the ejecting bar cannot be rotatably driven at the time of high velocity rotation of the spindle to thereby prevent occurrence of vibration, noise and frictional heat, and so that the workpiece can be ejected smoothly. The workpiece ejecting device comprises: a front bearing unit installed at an inner peripheral surface of a front end portion of the drawing tube; an ejecting cylinder located behind the chucking cylinder and installed directly on an axial line identical with that of the front bearing unit, and an ejecting rod, wherein the ejecting rod is provided at a center axis thereof with at least one fluid passing opening through which fluid for removing alien materials is supplied, and a front end of the ejecting rod is installed to be supported by the front bearing unit.

9 Claims, 5 Drawing Sheets

WORKPIECE EJECTING DEVICE FOR A MACHINE TOOL

BACKGROUND OF THE INVENTION

1. Field of the Invention

The invention relates to a device for automatically ejecting a workpiece chucked to a spindle in a machine tool, in particular, to such a workpiece ejecting device for the machine tool, which can smoothly eject the workpiece by means of separate ejecting operation without any affection from the rotation of the spindle.

2. Background of the Related Art

In general, a spindle of the machine tool (for example, an NC lathe and the like) is provided at opposite side of a main spindle to perform cutting work of a workpiece, and the cutting worked workpiece is ejected automatically from a chuck by means of ejection operation of the ejecting device.

Figure 5:
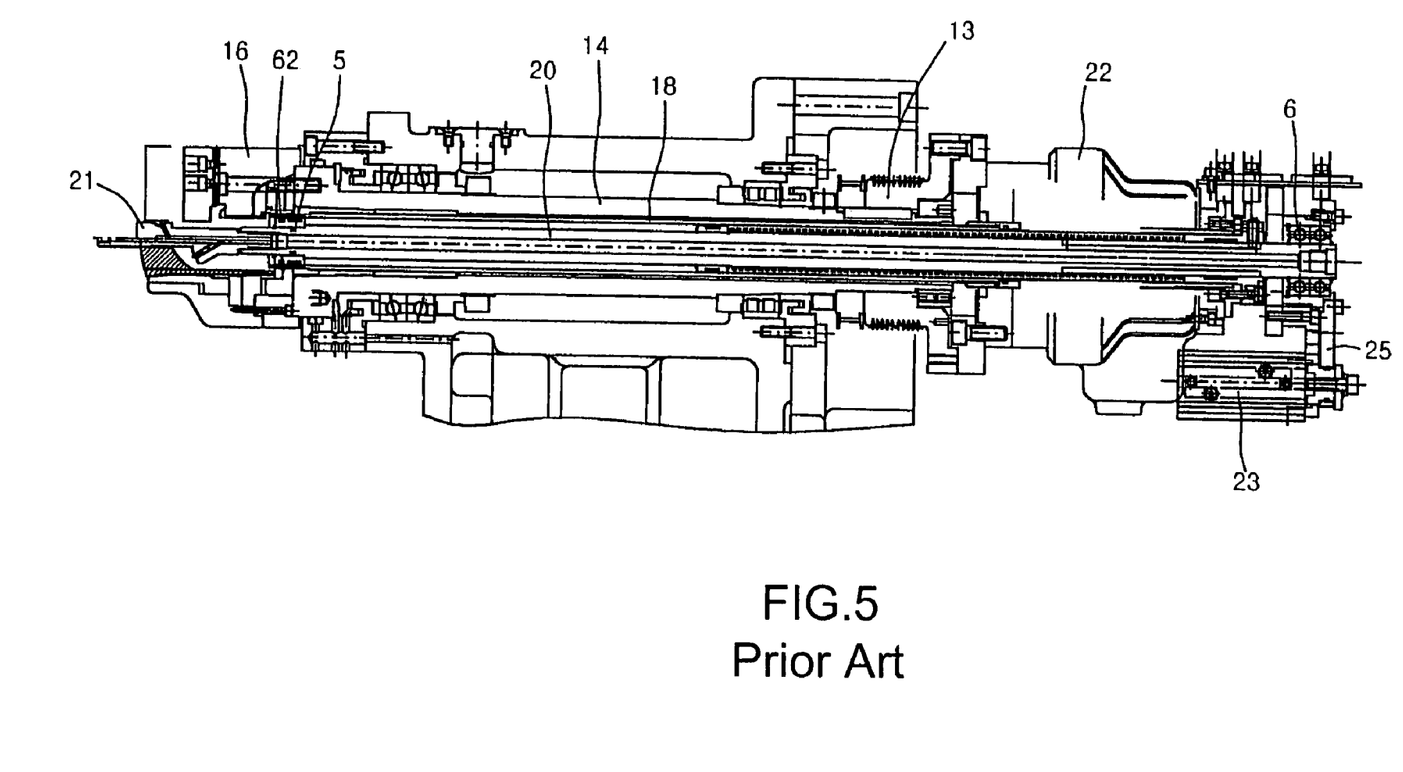
FIG. 5 is a view showing the structure of the conventional workpiece ejecting device of the NC lathe.

The conventional ejecting device for the spindle for automatically ejecting the workpiece is shown in FIG. 5 showing an assembling section of the conventional spindle assembly. As shown in the drawing, a chuck 16 is mounted at the spindle 14 to clamp the workpiece. The chuck 16 is connected to a front end of a drawing tube 18. A rear end of the drawing tube 18 is positioned at rear side of the spindle 14 so that it is connected to a chucking cylinder 22 for clamping/unclamping the chuck 16. Also, a workpiece ejecting rod 20 is positioned within the drawing tube 18 to discharge the workpiece. The workpiece ejecting rod 20 is connected to an ejecting cylinder 23 positioned at rearward lower side of the chucking cylinder 22 so that it can move forward and rearward. A front end of the workpiece ejecting rod 20 is supported by the drawing tube 18 by means of an inner guide 5, and also a rear end of the workpiece ejecting rod 20 is rotatably supported by means of a bearing 6.

Accordingly, the ejecting operation of the workpiece is progressed as follows after the machined workpiece has been clamped to the chuck 16.

At first, the drawing tube 18 is moved forward by the operation of the chucking cylinder 22 to unclamp the chuck 16. Then, the ejecting cylinder 23 is operated to move forward a locater 21 connected to the workpiece ejecting rod 20 to push and eject the workpiece. In this case, the front end of the workpiece ejecting rod 20 is supported by the sliding movement of an oil seal 62 installed at an outer peripheral surface of the inner guide 5 along an inner peripheral surface of the drawing tube 18.

Meanwhile, when the spindle 14 is rotated by the rotation drive of a pully 13 during the machining of the workpiece, the ejecting rod 20 also rotates via the drawing tube 18 and the inner guide 5. In this case, the ejecting rod 20 rotates with eccentric while being supported by the bearing 6 installed at rear end thereof.

At this time, the ejecting rod 20 rotates eccentrically with while being supported by the rear side bearing 6. In addition, when the spindle rotates at high velocity above 5,000 rpm, the ejecting rod 20 produces vibration, noise and heat to thereby cause bending deformation of the ejecting rod 20. Also, when the ejecting rod 20 moves forward and rearward, it may be caught between the bearings 6 to cause malfunction of the ejecting operation.

Furthermore, as the ejecting cylinder 23 is configured to be an eccentric axis operation structure so that it can push or pull the workpiece ejecting rod 20 by means of a bracket 25 with it strayed out of the axial moving line of the spindle 14, malfunction can be easily brought about at the time of the ejecting operation of the ejecting rod 20.

SUMMARY OF THE INVENTION

Therefore, the present invention has been made in view of the above problems occurring in the prior art, and it is an object of the present invention to provide an workpiece ejecting device for a machine tool, in which the ejecting bar cannot be rotatably driven at the time of high speed rotation of the spindle to thereby prevent occurrence of vibration, noise and frictional heat owing to the movement of the spindle, so that the machined workpiece can be ejected smoothly.

To accomplish the above object of the present invention, according to the first embodiment of the present invention, there is provided a workpiece ejecting device for a machine tool including a head stock, a spindle installed rotatably at the head stock, a chuck installed at a front end surface of the spindle to clamp the workpiece, a drawing tube installed at the inside of the spindle as a hollow shaft and connected at a front end thereof to the chuck to rotate integrally with the spindle, and a chucking cylinder installed at the head stock so that it can clamp or unclamp the workpiece clamped at the chuck by moving the drawing tube forward and rearward in the axial direction, the workpiece ejecting device comprising: an ejecting cylinder mounted at one side of the head stock in such a fashion that its center is aligned with the center of the spindle; an ejecting rod adapted not to rotate and having a length extending from the hollow inside of the drawing tube to a position adjacent to the chuck 16, the ejecting rod being axially formed at the inside thereof with a fluid passing opening, and being moved reciprocally in the axial direction as a rod for the ejecting cylinder by means of the ejecting cylinder to thereby push the unclamped workpiece from the chuck to the outside; and a front bearing unit installed between an inner peripheral surface of the drawing tube opposite to the ejecting cylinder and an outer peripheral surface of the ejecting rod so that it can support the rotation of the drawing tube.

Also, according to another embodiment of the present invention, there is provided a workpiece ejecting device for a machine tool including a head stock, a spindle installed rotatably at the head stock, a chuck installed at a front end surface of the spindle to clamp the workpiece, a drawing tube installed at the inside of the spindle as a hollow shaft and connected at a front end thereof to the chuck to rotate integrally with the spindle, and a chucking cylinder installed at the head stock so that it can clamp or unclamp the workpiece clamped at the chuck by moving the drawing tube forward and rearward in the axial direction, the workpiece ejecting device comprising: an ejecting cylinder mounted at one side of the head stock and having a cylinder rod; an ejecting rod adapted not to rotate and connected to a piston rod of the ejecting cylinder by a connection member, the ejecting rod having a length extending from the hollow inside of the drawing tube to a position adjacent to the chuck, being axially formed at the inside thereof with a fluid passing opening, and being moved reciprocally in the axial direction by means of the ejecting cylinder to thereby push the unclamped workpiece from the chuck to the outside; a front bearing unit installed between an inner peripheral surface of the drawing tube opposite to the ejecting cylinder and an outer peripheral surface of the ejecting rod so that it can support the rotation of the drawing tube; and a rear dual bearing unit installed at the side of the chucking cylinder so that the rear end of the ejecting rod is not rotated.

Further, the front bearing unit of the present invention includes a bearing housing inserted into the inner peripheral surface of the drawing tube; at least one bearing inserted into an inner peripheral surface of the bearing housing and at the same time clamped to an inner peripheral surface of the ejecting rod; and means for clamping the bearing to the ejecting rod.

Moreover, the bearing clamping means of the present invention includes a spacer for pushing an inner ring of the bearing to a stepped portion of the ejecting rod; and a lock nut thread engaged with the ejecting rod to fix a position of the spacer.

In addition, according to the present invention, an O-ring is installed at an outer peripheral surface of the bearing housing so that it contacts slidably with the inner peripheral surface of the drawing tube to block flowing in of the coolant, and an oil seal is installed at an inner peripheral surface of the bearing housing.

Also, according to the present invention, the rear end dual bearing unit includes an inner bearing housing inserted into rear end portion of the ejecting rod; an outer bearing housing inserted into an outer peripheral surface of the inner bearing housing and clamped to the chucking cylinder; and a bearing installed between the inner bearing housing and the outer bearing housing.

Further, according to the present invention, an oil-less bearing is further installed in an inner peripheral surface of the inner bearing housing so that it can support the ejecting rod slidably.

According to further embodiment of the present invention, there is also provided a workpiece ejecting device for a machine tool including a head stock, a spindle installed rotatably at the head stock, a chuck installed at a front end surface of the spindle to clamp the workpiece, a drawing tube installed at the inside of the spindle as a hollow shaft and connected at a front end thereof to the chuck to rotate integrally with the spindle, and a chucking cylinder installed at the head stock so that it can clamp or unclamp the workpiece clamped at the chuck by moving the drawing tube forward and rearward in the axial direction, the workpiece ejecting device comprising: an ejecting cylinder mounted at one side of the head stock in such a fashion that its center is aligned with the center of the spindle; an ejecting rod adapted not to rotate and having a length extending from the hollow inside of the drawing tube to a position adjacent to the chuck, the ejecting rod being axially formed at the inside thereof with a fluid passing opening, and being directly connected the rear end thereof to the front end a cylinder rod of the ejecting cylinder and moved reciprocally in the axial direction as a rod for the ejecting cylinder by means of the ejecting cylinder to thereby push the unclamped workpiece from the chuck to the outside; and a front bearing unit installed between an inner peripheral surface of the drawing tube opposite to the ejecting cylinder and an outer peripheral surface of the ejecting rod so that it can support the rotation of the drawing tube.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiment of the present invention with reference to the attached drawings.

First Embodiment

In the first embodiment of the present invention, the rod of the ejecting cylinder is configured in such a fashion that its length extends to a position adjacent to a chuck so that it can perform ejection function, and it is configured to be supported by a front bearing unit so that it cannot rotate together with a spindle or a drawing tube. Also, cutting oil can be supplied via a fluid passing opening formed passing through the center of the rod in the ejecting cylinder in the longitudinal direction.

Figure 1:
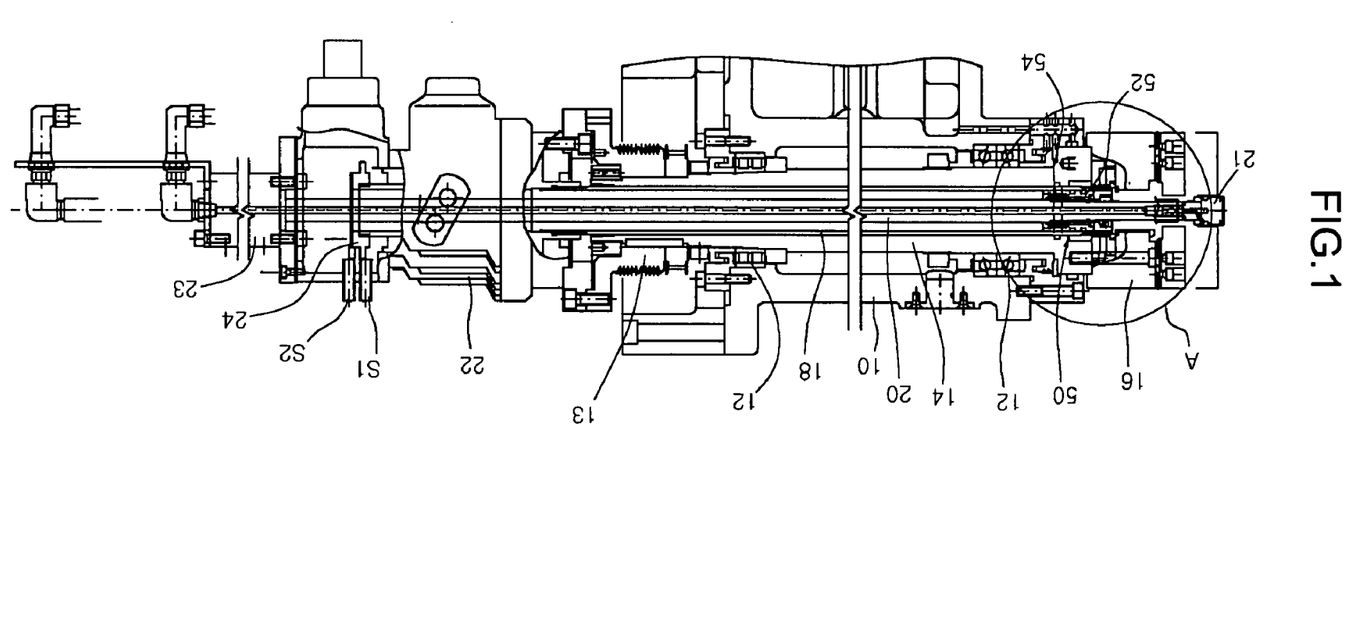
FIG. 1 is an assembly sectional view showing structure of the workpiece ejecting device of an NC lath according to the first embodiment of the present invention.
Figure 2:
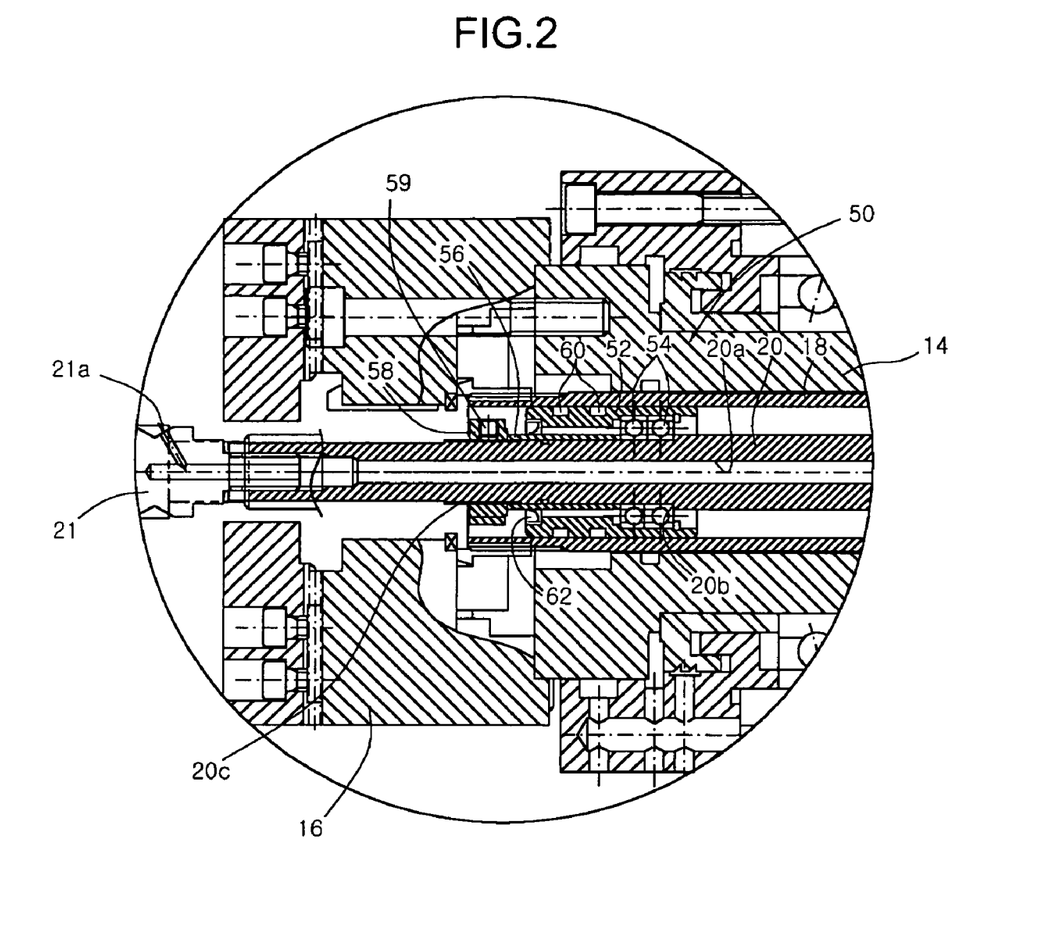
FIG. 2 is an enlarged view of portion "A" in FIG. 1.

FIG. 1 is an assembly sectional view showing structure of the workpiece ejecting device of an NC lathe according to the first embodiment of the present invention, and FIG. 2 is an enlarged view of portion "A" in FIG. 1.

In the first embodiment of the present invention, as shown in FIG. 1 and FIG. 2, a spindle 14 is installed to a head stock 10, and is rotatably supported by a bearing 12. The spindle 14 is provided with a spindle pully 13 configured to be rotated by means of a drive motor (not shown).

However, the present invention can be, of course, applied to the spindle driven by a built-in motor.

Also, the spindle 14 is provided at a front end thereof with a chuck 16 for clamping the workpiece, and the chuck 16 is connected to a front end of the cylindrical drawing tube 18 mounted in such a fashion as to pass through the center of the spindle 14.

A rear end of the drawing tube 18 is also connected to a chucking cylinder 22 mounted to the head stock 10 and arranged behind the spindle 14, so that the drawing tube 18 can move forward and rearward in the axial direction to clamp/unclamp the chuck 16 depending on the operation direction of the air or compressed oil in the chucking cylinder 22.

In this case, the clamp/unclamp operation of the chuck 16 is carried out by means of an unclamp sensor S1 and a clamp sensor S2, which detects a dog 24 operating in connection with the transfer position of the drawing tube 18. As shown in FIG. 2, the unclamp sensor S1 confirms the unclamping operation of the chuck 16 by detecting the dog 24 when the drawing tube 18 finishes the forward movement.

Also, the drawing tube 18 is provided with a front bearing unit 50 at an inner peripheral surface thereof so that it can slidably support linear movement of an ejecting rod 20 and does not rotate together with the drawing tube 18.

The ejecting rod 20, which is the rod of the ejecting cylinder 23, is supported by the front bearing unit 50, and the ejecting cylinder 23 is mounted at one side of the head stock 10 in such a fashion that its center is aligned with that of the spindle 14.

The front bearing unit 50 operates to interrupt the transfer of the rotation movement of the drawing tube 18 to the ejecting rod 20, and it supports the ejecting rod 20 so that it can slidably move forward and rearward.

As shown in FIG. 2, the front bearing unit 50 comprises a bearing housing 52 installed into an inner peripheral surface of the drawing tube 18, at least one bearing 54 installed within the bearing housing 52, and means for clamping the bearing 54 to the ejecting rod 20.

Further, in the present embodiment of the invention, the bearing clamping means comprises a spacer 56 for pushing an inside ring of the bearing 54 to a stepped portion 20b of the ejecting rod 20, and a lock nut 58 for clamping the position of the spacer 56. In this case, the lock nut 58 is engaged with a thread portion 20c of the ejecting rod 20 by means of a screw and is clamped by a fixing bolt 59.

Meanwhile, the front bearing unit 50 is provided with an O-ring 60 and an oil seal 62, which are adapted to prevent invasion of the coolant flowed in through inside of the chuck 16 at the time of working the workpiece. A plurality of O-rings 60 are installed at an outer peripheral surface of the bearing housing 52 to be in contact with the inner peripheral surface of the drawing tube 18. The oil seal 62 is installed between the bearing housing 52 and a collar 56.

The ejecting cylinder 23 is axially formed at the center thereof with fluid passing opening 20a through which the integral ejecting rod 20 moves forward and rearward, so that it can be formed integrally with the ejecting rod.

The ejecting rod 20 is arranged at the inside of the drawing tube 18 in such fashion as to be positioned on an identical center line to the drawing tube. A front end of the ejecting rod 20 is inserted into and supported by the inside ring of the bearing 54 installed in the front bearing unit 50, as shown in FIG. 2.

The operation of the workpiece ejecting device of the machine tool constructed as above according to the first embodiment of the present invention will now described in detail below.

At first, when the workpiece is machined with the workpiece clamped to the chuck 16, the spindle 14 and the drawing tube 18 rotate at high velocity integrally. In this case, the rotation force of the drawing tube 18 can be transferred to the bearing housing 52, and a bearing ball of the bearing 54, however it is not transferred to the inside ring of the bearing 54. In other words, as the rotation force of the drawing tube 18 cannot be transferred to the ejecting rod 20 inserted into the inside ring of the bearing 54, the ejecting rod 20 is maintained under stopped state.

Accordingly, because the ejecting rod 20 is maintained to be stopped in spite of the high velocity rotation of the spindle 14, vibration cannot occur to thereby enhance durability and endurance property of the workpiece ejecting cylinder 23. In this case, the bearing 54 can be protected from the coolant invaded from inside of the chuck 16, because it is blocked by the O-ring 60 and the oil seal 62.

Meanwhile, when the machining of the workpiece has been finished to stop the operation of the spindle 14, the chucking cylinder 22 is actuated to move the drawing tube 18 forwardly thereby to unclamp the chuck 16. Such unclamp operation is confirmed by the unclamp sensor S1, and a signal for ejecting the workpiece is transferred to the ejecting cylinder 23.

Accordingly, the ejecting rod 20 of the workpiece ejecting cylinder 23 moves forward integrally with the locater 21 to push and eject the workpiece from the chuck 16. In this case, the finish of the forward movement of the ejecting rod 20 can be confirmed by an inside sensor of the chucking cylinder 23. Further, the bearing housing 52 moves together with the bearing 54 along the inside surface of the drawing tube 18, and the O-ring 60 moves slidably along the inside surface of the drawing tube 18.

Meanwhile, chips attached to a jaw and the workpiece are discharged when and after the workpiece is ejected. Coolant or air can be supplied through the fluid passing opening 20a formed at the ejecting rod 20 of the ejecting cylinder 23 so as to discharge such alien substances including the chips. Such coolant or air can be injected through an injection opening 21a formed at the locater 21.

Thus, according to the first embodiment of the present invention, because the ejecting rod 20 can be prevented from moving by the front bearing unit 50 although the spindle 14 is rotatably driven at the time of machining the workpiece, occurrence of vibration, noise and frictional heat arising from movement can be hindered to thereby prevent the ejecting rod 20 from being bent.

Moreover, the workpiece ejecting cylinder 23 with the ejecting rod 20 is arranged in a linear relation with the drawing tube 18 and actuated, so that ejecting operation can be carried out more smoothly in contrast to the conventional structure in which force from the cylinder could be transferred at an eccentric position.

In addition, the ejecting rod 20 can be directly connected on an identical axial line with separation from the ejecting cylinder 22, as a modified embodiment of the first embodiment of the present invention. In other words, as shown in FIG. 2, a separate ejecting rod 20 is provided so that a front end thereof can be installed to be inserted and supported by the inner peripheral surface of the front bearing unit 50, and a rear end of the ejecting rod 20 can be installed to directly be connected to a piston rod of the ejecting cylinder 22 linearly.

In other words, as shown in FIG. 2, the ejecting rod 20 separated from the ejecting cylinder 23 can be provided to be long, and a front end thereof can be installed to be inserted and supported by the inside peripheral surface of the front bearing unit 50, and a rear end of the ejecting rod 20 can be installed directly to the rod of the ejecting cylinder 23 linearly. In this case, the rear end of the ejecting rod 20 can be connected to the rod of the ejecting cylinder 23 by means of conventional thread Engagement of flange engagement, and the fluid passing opening 20a shown in FIG. 2 can be, of course, formed at the rod of the ejecting rod 20 and the ejecting cylinder 23 directly connected in the above manner.

Second Embodiment

Figure 3:
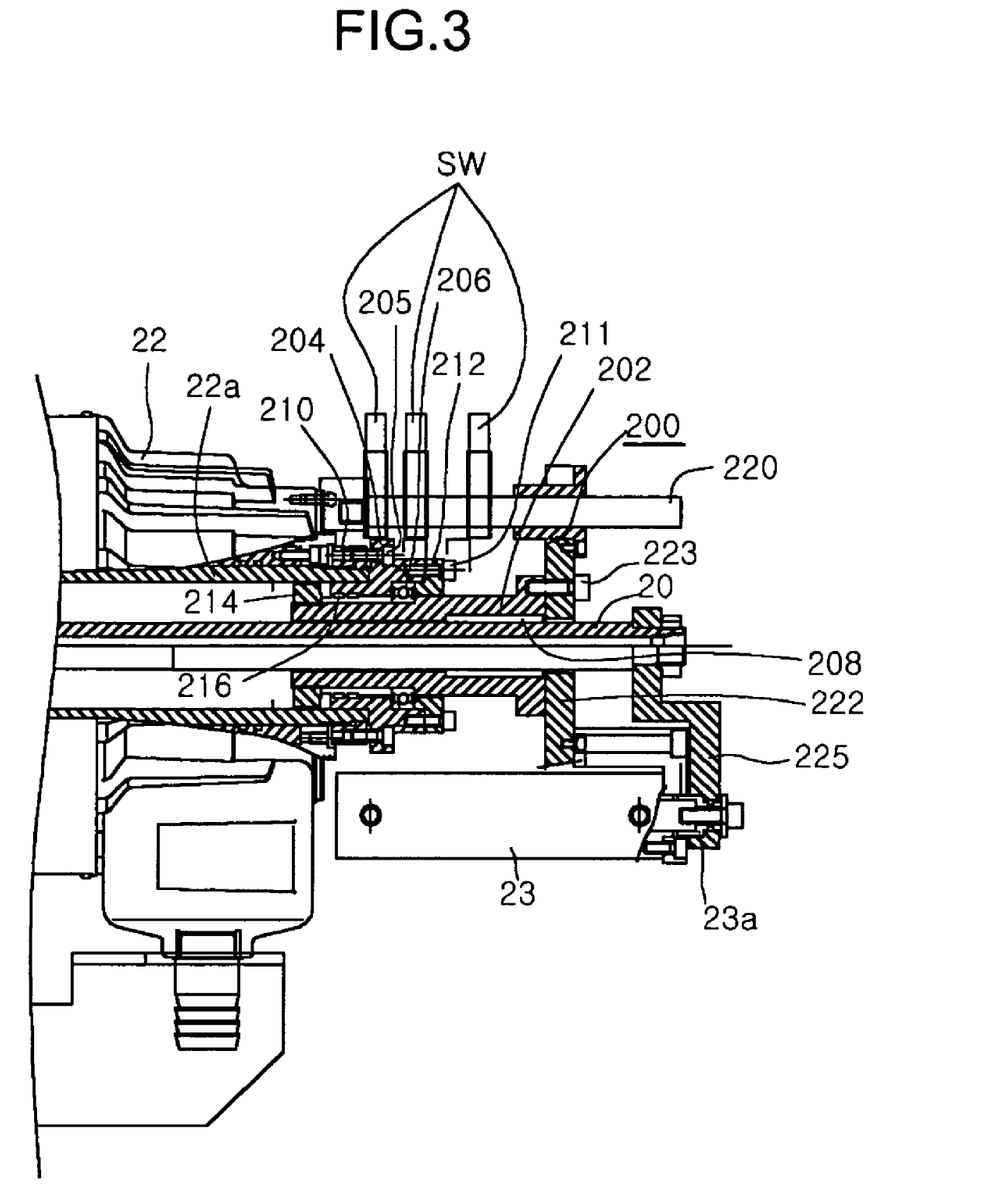
FIG. 3 is a view showing main portion of the workpiece ejecting device for the machine tool according to the second embodiment of the present invention.
Figure 4:
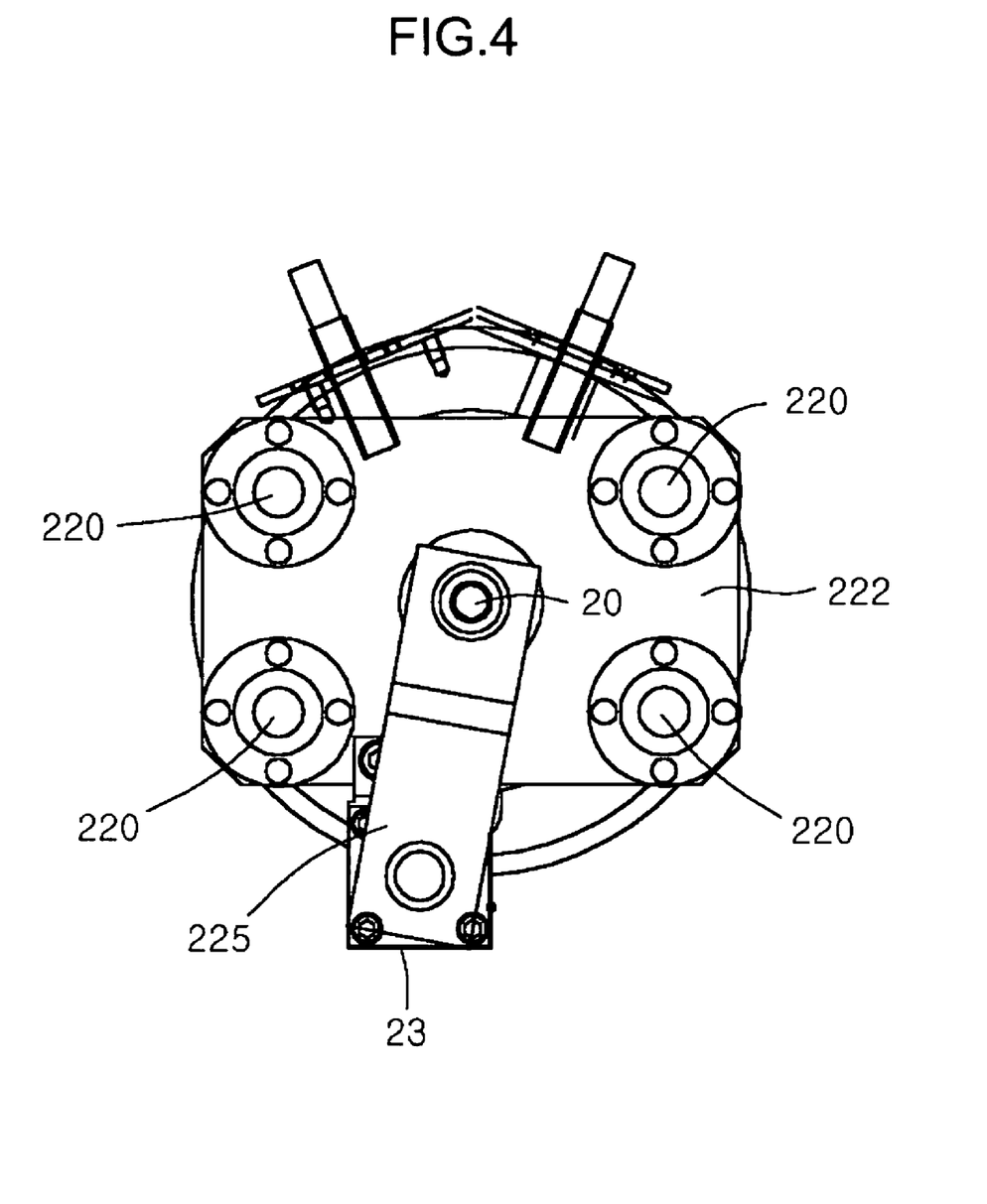
FIG. 4 is a side view of FIG. 3.

As shown in FIG. 3, the second embodiment of the present invention modifies the supporting structure of the rear end of the ejecting rod, which is used for ejecting the workpiece. FIG. 4 shows a side view of FIG. 3.

In the second embodiment, the ejecting rod is so configured that it cannot rotate integrally with the drawing tube 18. In this regard, the front end of the ejecting rod is adapted to be supported by the front bearing unit 50 as was in the first embodiment. Also, it is characterized in that the rear end of the ejecting rod is supported by means of the rear end dual bearing unit 200.

Also, in the second embodiment of the present invention, the ejecting cylinder 23 is arranged in parallel with the ejecting rod 20, and the piston rod 23a of the ejecting cylinder 23 is connected to the rear end of the ejecting rod 20 via a connection member 225.

Hereinafter, the operation and structure of the rear end dual bearing unit 200 supporting the rear end of the ejecting rod of the second embodiment will be described in detail below. In FIGS. 3 and 4, same numerals are indicated for the same or equal parts of the device shown FIGS. 1 and 2.

As shown in FIGS. 3 and 4, the rear end dual bearing unit 200 is provided with an inner bearing housing 202 having an inside diameter through which the rear end of the ejecting rod 20 passes. Also, an outer bearing housing 204 is provided at an outside diameter of the inner bearing housing 202. A bearing 206 is installed between the inner bearing housing 202 and the outer bearing housing 204.

In this instance, the outer bearing housing 204 is connected to a lock nut 210 via a bolt 205. The lock nut 210 is secured to a rotation portion of the chucking cylinder 22 by means of thread engagement. Therefore, the outer bearing housing 204 rotates together with the rotation of the rotation portion 22a of the chucking cylinder 22. Further, the outer bearing housing 204 moves linearly together with the linear movement of the rotation portion 22a of the chucking cylinder 22.

Accordingly, the operation and structure of the rear end dual bearing unit 200 supporting the rear end of the ejecting rod of the second embodiment will be described in detail below. In FIGS. 3 and 4, same numerals are indicated for the same or equal parts of the device shown FIGS. 1 and 2.

As shown in FIGS. 3 and 4, the rear end dual bearing unit 200 is provided with an inner bearing housing 202 having an inside diameter through which the rear end of the ejecting rod 20 passes. Also, an outer bearing housing 204 is provided at an outer peripheral surface of the inner bearing housing 202. A bearing 206 is installed between the inner bearing housing 202 and the outer bearing housing 204.

In this case, the outer bearing housing 204 is connected to a lock nut 210 via a bolt 205. The lock nut 210 is secured to a rotation portion of the chucking cylinder 22 by means of thread engagement. Therefore, the outer bearing housing 204 rotates together with the rotation of the rotation portion 22a of the chucking cylinder 22. Further, the outer bearing housing 204 moves linearly together with the linear movement of the rotation portion 22a of the chucking cylinder 22.

The outside ring of the bearing 206 is secured to the outer bearing housing 204 by means of a bearing cap 212 mounted by a bolt 211. Also, an inside ring of the bearing 206 is pushed by the lock nut 214 to be secured by means of a spacer 216.

An oilless bearing 208 is mounted in the inner peripheral surface of the inner bearing housing 202 to slidably support the ejecting rod 20, and the inner bearing housing 202 is secured to a bracket 222 connected to a supporting bar 220 by means of a bolt 223. The piston rod 23a of the ejecting cylinder 23 is connected to the rear end of the ejecting rod 20 via a connection member 225.

Hereinafter, it will be explained that the ejecting rod can move linearly without receiving the rotation force of the spindle 14 independently, when the ejecting rod 20 is constructed as described above.

When the spindle 14 rotates to machine the workpiece, the drawing tube 18 rotates also while simultaneously rotating the rotation portion 22a of the chucking cylinder 22 connected to the drawing tube 18. Also, the outer bearing housing 204 rotates as it is connected to the rotation portion of the chucking cylinder 22 via the lock nut 210.

In this case, the inner bearing housing 202 is connected to the outer bearing housing 204 via the bearing 206 and secured to the bracket 222 so that it does not rotate.

Accordingly, the rear end of the ejecting rod 20 supported in the inner bearing housing 202 via the oil-less bearing 208 is not transmitted of the rotation force. At the same time, the front end of the ejecting rod 20 cannot be transmitted with the rotation force as it is supported by the bearing 54 of the front bearing unit 50.

As described above, the ejecting rod 20 cannot rotate because the rotation force is not transmitted to the ejecting rod 20 by means of the front bearing unit 54 and the rear end bearing 206 installed, respectively, at the front and rear side of the ejecting rod 20 in spite of the rotation of the drawing tube 18.

Thus, as the rotational force is not transmitted to the ejecting rod 20 and it is maintained at a stopped position in spite of the rotational drive of the spindle 14, vibration or frictional heat arising from the movement is not produced. Also, the rear end dual bearing unit 200 only moves linearly by means of the oil-less bearing 208 when the chucking cylinder 22 operates.

As described above, according to the second embodiment of the present invention, the workpiece ejecting device of the present invention is constructed as a separate structure in which the ejecting rod 20 does not rotate by means of the front bearing unit 50 and the rear end dual bearing unit 200 in spite the rotation movement of the spindle 14, so that vibration, noise and bending deformation of the ejecting rod 20 do not occur in spite of the high velocity rotation of the spindle 14.

Accordingly, because jamming force is not produced when the ejecting rod 12 reciprocates linearly by means of the ejecting cylinder 23 as in the conventional art, the ejecting operation is performed smoothly to thereby enhance workpiece ejecting reliability.

As described above, according to the workpiece ejecting device for the machine tool of the present invention, because the ejecting rod is constructed to be supported by the front bearing unit or the rear end dual bearing unit so that it can independently move linearly without any affect from the high velocity rotation movement of the spindle, it is possible to prevent occurrence of vibration, noise and frictional heat.

Also, as the bending of the ejecting rod can be prevented by the structure of suppressing the occurrence of vibration in the ejecting rod to result in smooth ejecting operation, it is possible to enhance the ejecting operation of the workpiece.

While the present invention has been described with reference to the particular illustrative embodiments, it is not to be restricted by the embodiments but only by the appended claims. Also, it is to be appreciated that those skilled in the art can change or modify the embodiments without departing from the scope and spirit of the present invention.

What is claimed is:

1. A workpiece ejecting device for a machine tool including a head stock, a spindle installed rotatably at the head stock, a chuck installed at a front end surface of the spindle to clamp the workpiece, a drawing tube installed at the inside of the spindle as a hollow shaft and connected at a front end thereof to the chuck to rotate integrally with the spindle, and a chucking cylinder installed at the head stock so that it can clamp or unclamp the workpiece clamped at the chuck by moving the drawing tube forward and rearward in the axial direction, the workpiece ejecting device comprising:

an ejecting cylinder mounted at one side of the head stock in such a fashion that its center is aligned with the center of the spindle;

an ejecting rod adapted not to rotate and having a length extending from the hollow inside of the drawing tube to a position adjacent to the chuck, the ejecting rod being axially formed at the inside thereof with a fluid passing opening, and being moved reciprocally in the axial direction as a rod for the ejecting cylinder by means of the ejecting cylinder to thereby push the unclamped workpiece from the chuck to the outside; and a front bearing unit installed between an inner peripheral surface of the drawing tube opposite to the ejecting cylinder and an outer peripheral surface of the ejecting rod so that it can support the rotation of the drawing tube.

2. The ejecting device according to claim 1 wherein the front bearing unit comprises:

A bearing housing inserted into the inner peripheral surface of the drawing tube;

At least one bearing inserted into an inner peripheral surface of the bearing housing and at the same time clamped to an outer peripheral surface of the ejecting rod; and means for clamping the bearing to the ejecting rod.

3. The ejecting device according, to claim 2, wherein the bearing clamping means comprises:

a spacer for pushing an inner ring of the bearing to a stepped portion of the ejecting rod; and a lock nut thread engaged with the ejecting rod to clamp a position of the spacer.

4. The ejecting device according to claim 2, wherein an O-ring is installed at an outer peripheral surface of the bearing housing so that it contacts slidably with the inner peripheral surface of the drawing tube to block flowing in of coolant, and an oil seal is installed at an inner peripheral surface of the bearing housing.

5. A workpiece ejecting device for a machine tool including a head stock, a spindle installed rotatably at the head stock, a chuck installed at a front end surface of the spindle to clamp the workpiece, a drawing tube installed at the inside of the spindle as a hollow shaft and connected at a front end thereof to the chuck to rotate integrally with the spindle, and a chucking cylinder installed at the head stock so that it can clamp or unclamp the workpiece clamped at the chuck by moving the drawing tube forward and rearward in the axial direction, the workpiece ejecting device comprising:

an ejecting cylinder mounted at one side of the head stock in such a fashion that its center is aligned with the center of the spindle;

an ejecting rod adapted not to rotate and having a length extending the hollow inside of the drawing tube to a position adjacent to the chuck, the ejecting rod being axially formed at the inside thereof with a fluid passing opening, and being directly connected at the rear end thereof to the front end of a cylinder rod of the ejecting cylinder and moved reciprocally in the axial direction as a rod for the ejecting cylinder by means of the ejecting cylinder to thereby push the unclamped workpiece from the chuck to the outside; and a front bearing unit installed between an inner peripheral surface of the drawing tube opposite to the ejecting cylinder and an outer peripheral surface of the ejecting rod so that it can support the rotation of the drawing tube.

6. The ejecting device according to claim 5, wherein the front bearing unit comprises:

a bearing housing inserted into the inner peripheral surface of the drawing tube;

at least one bearing inserted into an inner peripheral surface of the bearing housing and at the same time clamped to an inner peripheral surface of the ejecting rod; and means for clamping the bearing to the ejecting rod.

7. The ejecting device according to claim 5, wherein the bearing clamping means comprises:

a spacer for pushing an inner ring of the bearing to a stepped portion of the ejecting rod; and a lock nut thread engaged with the ejecting rod to clamp a position of the spacer.

8. The ejecting device according to claim 5, wherein the rear end of the ejecting rod and the rod of the ejecting cylinder are screw-engaged with each other.

9. The ejecting device according to claim 5, wherein a fluid passing opening is formed at the center axis of the ejecting rod and the rod of the ejecting cylinder.

* * * * *